Oct. 3, 1950     E. T. YONAMINE     2,524,505
VEHICLE SPRING SUSPENSION
Filed Dec. 29, 1945     2 Sheets-Sheet 1
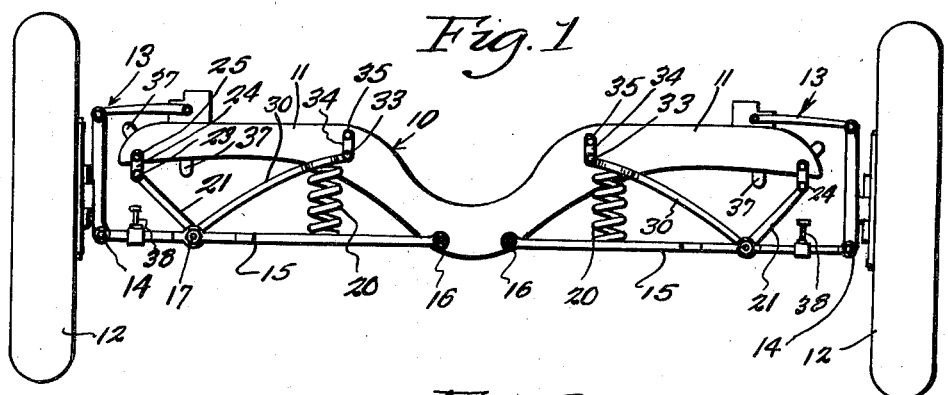
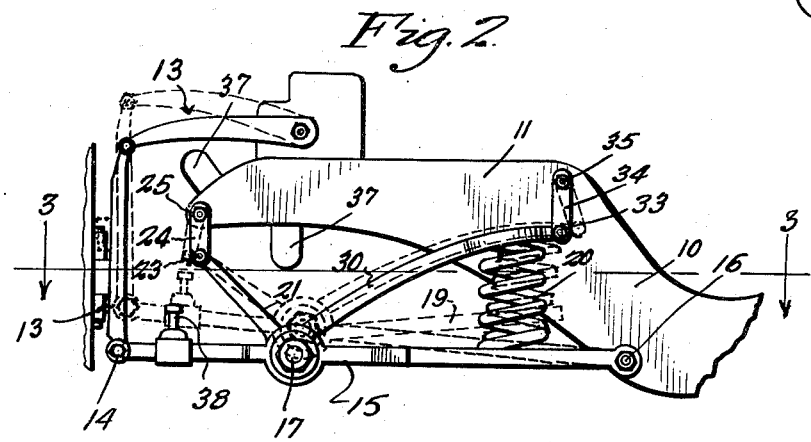
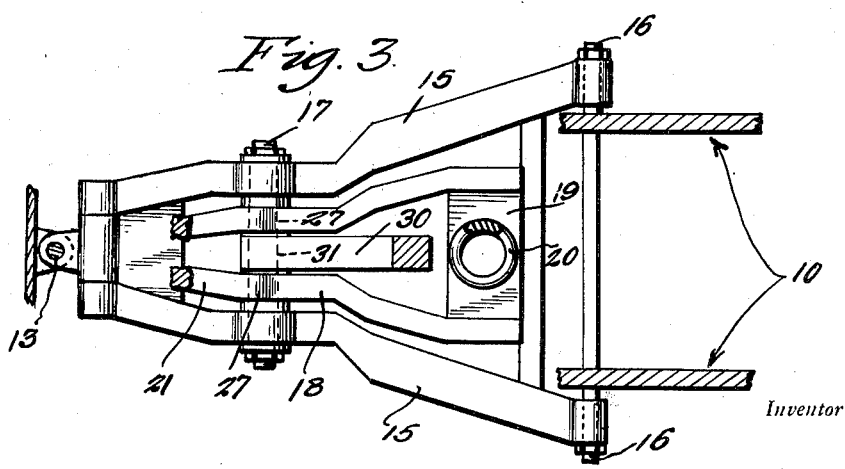
Inventor
Ernest Tadaski Yonamine
By Clarence A. O'Brien
and Harvey B. Jacobson
Attorneys

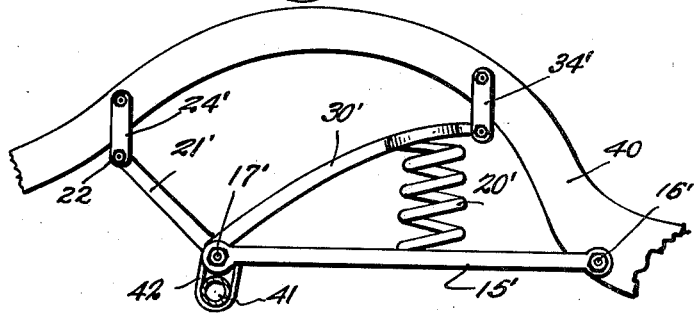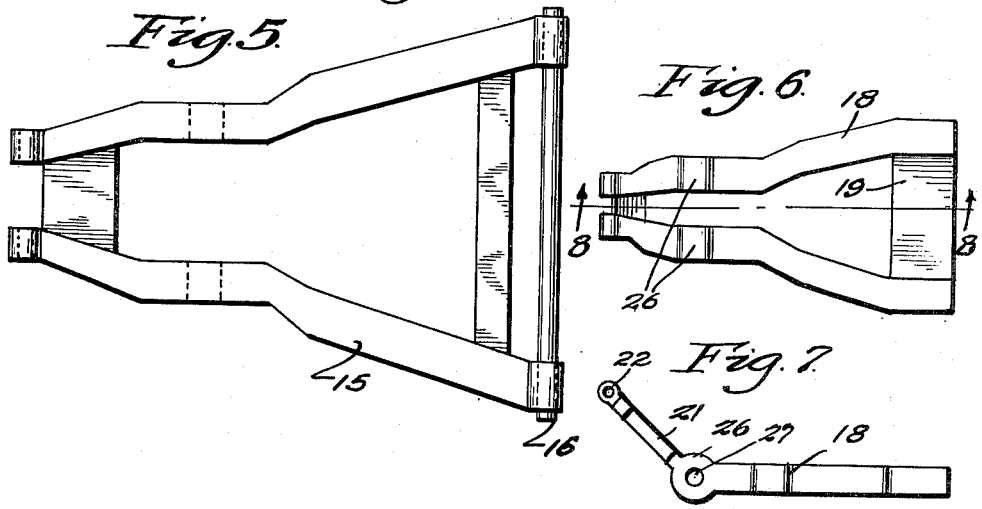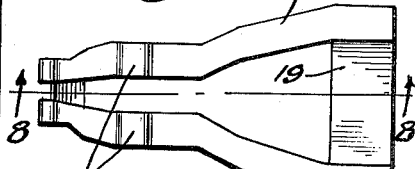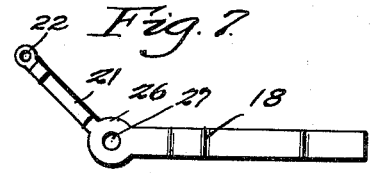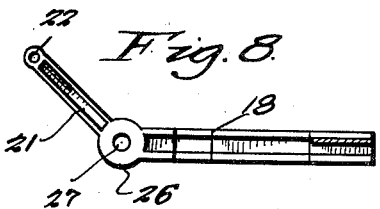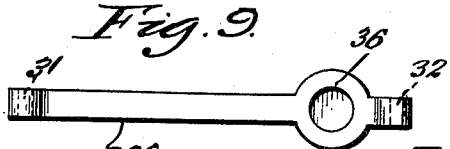

Patented Oct. 3, 1950

2,524,505

UNITED STATES PATENT OFFICE 2,524,505

VEHICLE SPRING SUSPENSION

Ernest Tadaski Yonamine, Honolulu, Territory of Hawaii

Application December 29, 1945, Serial No. 638,269

1 Claim. (Cl. 267—20)

This invention relates to vehicle spring suspension, and more particularly to such a suspension adapted for use with motor vehicles, such as automobiles, trucks, or the like.

A primary object of this invention is the provision of an improved means of spring suspension for vehicles whereby road shocks will be substantially minimized.

An additional object of the invention is the provision of such a spring suspension whereby vertical shocks imparted to the wheels of the vehicle will be cushioned by relatively heavy duty springs.

A further object of the invention is the provision of an improved spring mounting for motor vehicles permitting the use of a bowed frame, whereby the center of gravity of the motor of the vehicle may be relatively lowered, thus further increasing stability.

Other objects reside in the combinations of elements, arrangements of parts, and features of construction, all as will be more fully pointed out hereinafter and disclosed in the accompanying drawing, wherein there is shown a preferred embodiment of this inventive concept.

In the drawings:

Figure 1 is a front elevational view showing a fragment of a motor vehicle having the spring suspension of the instant invention applied thereto.

Figure 2 is an enlarged front elevational view of certain constructional elements shown in Figure 1.

Figure 3 is a sectional view taken substantially long the line 3—3 of Figure 2 as viewed in the direction indicated by the arrows.

Figure 4 is a fragmentary view showing a modified form of construction.

Figure 5 is a top plan view of the yoke.

Figure 6 is a top plan view of the rock arm.

Figure 7 is a side elevational view of the rock arm in Figure 6.

Figure 8 is a sectional view taken substantially along the line 8—8 of Figure 6 as viewed in the direction indicated by the arrows.

Figure 9 is a top plan view of the spring arm.

Similar reference characters refer to similar parts throughout the several views of the drawings.

Having reference now to the drawings, and more particularly to Figure 1, there is generally indicated at 10 a frame for a vehicle, provided with an upwardly offset portion 11. Wheels 12 are carried by suitable conventional steering mechanism and hydraulic shock absorbers generally indicated at 13, supported by the frame 11.

The lower portions of the steering knuckles comprising portions of the steering mechanism 13 have pivotally connected thereto as by means of a horizontally positioned pivot pin 14 the extremities of a yoke member 15. As best shown in Figure 3, the yoke 15 comprises two substantialy diverging arms, the converged portions of which engage the pivot pin 14, and the diverged extremities of which are pivotally mounted on pins 16 carried by the frame 10.

Aligned bores through the arms of the yoke 15 at an intermediate point serve as journals for a pivot 17, which supports between the arms 15 a rock arm 18 of a configuration generally similar to that of the yoke 15. The rock arm 18 is provided at one extremity with a relatively heavy duty plate 19 which serves as a seat for a heavy compression spring 20. As best shown in Figure 7, the extremity of the rock arm 18 beyond the pivot point 17 extends upwardly at an obtuse angle as indicated at 21. A transverse bore 22 extending across the extremity engages a pivot pin 23, which comprises a portion of a shackle link 24, the opposite extremity of which is pivoted as on a pivot pin 25 to the offset portion 11 of the frame 10 (see Figure 2). It is to be noted that the rock arm 18 adjacent the upwardly turned portion 21 is provided with an enlarged portion 26 through which passes a bore 27 adapted to pivotally surround the pivot pin 17.

A link 30 is provided at one extremity with a bore 31 (see Figure 9) through which passes the pivot pin 17, the link 30 being positioned between the diverged members of the yoke 18. Adjacent its opposite end the link 30 is provided with a bore 32 adapted to pivotally engage a pivot pin 33 comprising a part of a shackle link 34, the other end of the shackle link 34 being pivotally secured as by a pivot 35 to the offset portion 11 adjacent its junction with the frame 10. As best shown in Figure 9, the link 30 is provided with an enlarged circular pad 36 which serves as a seat for the upper end of the spring 20.

As best shown in Figures 1 and 2, suitable rubber shock absorbing bumpers 37 are provided at appropriate points on the offset portion of the frame 10, and conventional sway eliminator rods 38, of the type used on conventional coil spring suspensions are also provided.

In operation as the vehicle wheel 12 moves upwardly under impact such as caused by roughness in the road over which the vehicle is traveling, the yoke 15 swings upwardly about pivots 16 and causes the pivot 17 to advance toward the bumper 37. Such movement causes the rock arm 21 and the link 30 to rock downwardly about pivot 17. Downward movement of the arm 21 causes the plate 19 carried at the end of the rock arm 18 to move upwardly toward the link 30 as illustrated in the dotted lines in Figure 2 so that the force of the impact will be absorbed by the spring 20. Obviously the shackle links 24 and 34 cooperate to permit such movement of the arms 21 and 30 respectively.

A modified form of construction is disclosed in Figure 4, and adapted for rear axle construction. In this construction yoke 15' is provided and has one end secured to the frame 40, as by pivots 16'. The opposite end of the yoke 15' is suitably secured to the vehicle axle 41 as by U-bolts 42.

Pivotally mounted within the yoke 15' as on a pivot 17' is a rock arm 21' and a link 30' opposite ends of which are connected as by shackle links 24' and 34' to the offset portion 11' of the frame 40 in a manner substantially identical to the connection of members 21 and 30 to the frame 10. Obviously the theory of operation in this construction is substantially identical to that previously discussed.

From the foregoing it will now be seen that there is herein provided an improved method of vehicle suspension accomplishing all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

A vehicle suspension system which includes a vehicle frame member having an offset portion, a yoke pivoted at one end to the frame member for movement toward and away from the offset portion, a vehicle wheel support carried by the yoke adjacent the end thereof remote from the frame member, a rock arm pivoted intermediate its ends to the yoke on an axis remote from the frame member, a shackle coupling one end of the rock arm to the offset portion remote from the other portion of the frame member, a lever pivotally coupled at one end to the pivot of the rock arm, a second shackle coupling the end of the lever remote from the pivoted end thereof to the offset portion adjacent the said other portion of the frame member and a compression spring between opposite ends of the lever and the rock arm yieldingly to hold separated the opposite ends thereof.

ERNEST TADASKI YONAMINE.

REFERENCES CITED

The following references are of record in the file of this patent:

UNITED STATES PATENTS

| Number | Name | Date |
|---|---|---|
| 1,137,145 | Krarup | Apr. 27, 1915 |
| 1,389,135 | Hunt | Aug. 30, 1921 |
| 2,005,513 | Weaver | June 18, 1935 |
| 2,113,382 | Oppenheimer | Apr. 5, 1938 |

FOREIGN PATENTS

| Number | Country | Date |
|---|---|---|
| 449,828 | Germany | Sept. 21, 1927 |